(12) United States Patent
Noble (10) Patent No.: US 11,386,709 B2
(45) Date of Patent: Jul. 12, 2022

(54) SYSTEM AND METHOD FOR IMPROVING SIGNAL TO NOISE RATIO IN OBJECT TRACKING UNDER POOR LIGHT CONDITIONS

(71) Applicant: SEEING MACHINES LIMITED, Fyshwick (AU)

(72) Inventor: John Noble, Fyshwick (AU)

(73) Assignee: SEEING MACHINES LIMITED, Fyshwick (AU)

( * ) Notice: Subject to any disclaimer, the term of this patent is extended or adjusted under 35 U.S.C. 154(b) by 120 days.

(21) Appl. No.: 16/759,951

(22) PCT Filed: Jul. 27, 2018

(86) PCT No.: PCT/AU2018/050776
§ 371 (c)(1),
(2) Date: Apr. 28, 2020

(87) PCT Pub. No.: WO2019/084595
PCT Pub. Date: May 9, 2019

(65) Prior Publication Data
US 2020/0327323 A1    Oct. 15, 2020

(30) Foreign Application Priority Data
Oct. 31, 2017   (AU) ............................... 2017904419

(51) Int. Cl.
*G06V 40/19*    (2022.01)
*G03B 15/03*    (2021.01)
(Continued)

(52) U.S. Cl.
CPC ............ *G06V 40/19* (2022.01); *G03B 15/03* (2013.01); *G06T 7/20* (2013.01); *G06V 10/141* (2022.01);
(Continued)

(58) Field of Classification Search
CPC .................................. G03B 15/03; G06T 7/20
See application file for complete search history.

(56) References Cited

U.S. PATENT DOCUMENTS 9,131,150 B1 *   9/2015  Mangiat .............. H04N 5/2352
2010/0219327 A1 *  9/2010  Arbore .................... H02S 50/10
                                                              250/206
(Continued)

FOREIGN PATENT DOCUMENTS

JP      2009116797 A     5/2009
JP      2013175914 A     9/2013
(Continued)

OTHER PUBLICATIONS

Japanese Office Action (including English translation) issued in JP2020523296, dated May 10, 2022, 10 pages.

*Primary Examiner* — Edward Park
(74) *Attorney, Agent, or Firm* — Jason P. Mueller; FisherBroyles, LLP (57) ABSTRACT

Described herein is a system and method for performing eye tracking. One embodiment provides a system (100) including a camera (106) for capturing images of a vehicle driver's (102) eye and light emitting diodes (LEDs—108 and 110) configured to selectively illuminate the driver's eye during image capture by the camera (106). A processor (118) is configured to process at least a subset of the captured images to determine one or more eye tracking parameters of the subjects eye and to determine one or more illumination characteristics of the images. A controller (120) is configured to send an LED control signal to the LEDs (108 and 110) to control the drive current amplitude and pulse time of the LEDs (108 and 110). The controller (120) selectively adjusts the drive current amplitude and/or pulse time based on the determined illumination characteristics of a previous captured image or images.

16 Claims, 9 Drawing Sheets

(51) Int. Cl.
*G06T 7/20* (2017.01)
*G06V 10/141* (2022.01)
*G06V 20/59* (2022.01)
*G06V 40/20* (2022.01)

(52) U.S. Cl.
CPC ............ *G06V 20/597* (2022.01); *G06V 40/20* (2022.01); *G03B 2215/0567* (2013.01); *G06T 2207/10152* (2013.01); *G06T 2207/30041* (2013.01)

(56) References Cited

U.S. PATENT DOCUMENTS

| | | |
|---|---|---|
| 2015/0199003 A1 | 7/2015 | Zhang et al. |
| 2016/0198091 A1* | 7/2016 | Edwards ............... G06F 1/3206 348/78 |
| 2016/0358009 A1 | 12/2016 | Agrawal et al. |

FOREIGN PATENT DOCUMENTS

| | | |
|---|---|---|
| JP | 2016532396 A | 10/2016 |
| WO | 2016/131075 | 8/2016 |
| WO | 2017017896 | 2/2017 |

* cited by examiner

SYSTEM AND METHOD FOR IMPROVING SIGNAL TO NOISE RATIO IN OBJECT TRACKING UNDER POOR LIGHT CONDITIONS

This application is a national stage entry under 35 U.S.C. 371 of PCT Patent Application No. PCT/AU2018/050776, filed Jul. 27, 2018, which claims priority to Australia Patent Application No. 2017904419, filed Oct. 31, 2017, the entire contents of each of which is incorporated herein by reference.

FIELD OF THE INVENTION

The present invention relates to illumination systems and in particular to a method and system for tracking eyes or a head of a subject in images having varying illumination characteristics. While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

Head and eye tracking systems are used in a variety of applications including vehicle driver monitoring, pilot training and monitoring, and tracking consumer glances in market research. These systems involve the use of one or more cameras to capture images of the subject, identify their facial features, including eyes, and track the subject's gaze over sequences of images. To detect the subject's eyes, one or more light sources, typically LEDs, are used to illuminate the subject's face during image capture. An example eye tracking system is disclosed in U.S. Pat. No. 7,043,056 to Edwards et al., assigned to Seeing Machines Pty Ltd and entitled "Facial Image Processing System" (hereinafter "Edwards et al.").

Eye tracking systems may be quite robust under normal operating conditions. However, the systems often break down when the subject is a large distance from the camera or if the subject's eyes become partially occluded from the camera's view. An example where the subject's eyes become partially occluded is when the subject is wearing glasses in the presence of high glare (e.g. in a convertible vehicle) or wearing dark sunglasses. In these situations, the signal to noise ratio of an image becomes too low to accurately distinguish the subject's eye from surrounding objects in the image. The signal to noise ratio can be considered as comprising visible eye features as the signal component, while the noise component includes, inter alia, image sensor dark current noise, reflections from the environment on the eye, reflections from the environment on glasses lens, reflections from LEDs on glasses lens and motion blur.

As these scenarios of eye tracking breakdown are quite common, there is a desire to improve the robustness of eye tracking systems to provide more comprehensive and continuous tracking of eyes over a range of different environmental conditions.

SUMMARY OF THE INVENTION

In accordance with a first aspect of the present invention there is provided an imaging system including:
one or more cameras for capturing images of a subject;
one or more light emitting diodes (LEDs) configured to selectively illuminate the subject during image capture by the one or more cameras;
a processor configured to process at least a subset of the captured images to determine one or more tracking parameters of the subject and to determine one or more illumination characteristics of the images; and
a controller configured to send an LED control signal to the one or more LEDs to control the drive current amplitude and pulse time of the one or more LEDs, wherein the controller selectively adjusts the drive current amplitude and pulse time based on the determined illumination characteristics of a previous captured image or images.

In some embodiments, the controller is also configured to control an image sensor exposure time of the one or more cameras based on the determined illumination characteristics of a previous captured image or images.

In some embodiments, the controller is also configured to control an image sensor gain value of the one or more cameras based on the determined illumination characteristics of a previous captured image or images.

Preferably, the LED drive current pulse time is determined based on the image sensor exposure time. More preferably, the drive current amplitude is determined from the LED drive current pulse time based on a predefined relationship between the LED drive current amplitude to the LED drive current pulse time.

In some embodiments, the controller selectively adjusts the drive current amplitude and pulse time according to a predefined pulse handling curve specified by a manufacturer of the one or more LEDs. Preferably, the pulse handling curve includes a non-linear relationship between the drive current amplitude and pulse time for a given duty cycle.

In some embodiments, the illumination characteristics of a captured image include a brightness measure of the captured image. In one embodiment, the brightness measure includes an average pixel intensity of each pixel in the captured image.

In some embodiments, the system is configured to image one or both eyes of the subject.

In some embodiments, the processing of at least a subset of the captured images includes determining an eye pixel region corresponding to a localized region around the subject's eye. In some embodiments, the illumination characteristics include a brightness measure of the eye pixel region. In one embodiment, the brightness measure includes an average pixel intensity of the pixels within the eye pixel region. In one embodiment, the illumination characteristics include a measure of contrast of pixels within the eye pixel region.

In some embodiments, the processing of at least a subset of the captured images includes the detection of sunglasses on the subject. In these embodiments, the illumination characteristics include a darkness or reflectivity measure of the sunglasses.

In some embodiments, the processor is further configured to integrate the pixel values of corresponding pixels within the eye pixel regions of a plurality of previous captured images based on the determined illumination characteristics of a previous captured image or images.

In accordance with a second aspect of the present invention there is provided an imaging method including:

a) generating a camera control signal to control one or more cameras to capture images of a subject;

b) generating a light emitting diode (LED) control signal to control one or more LEDs to selectively illuminate the subject during image capture by the one or more cameras, the LED control signal controlling at least a drive current amplitude and pulse time of the one or more LEDs;

c) processing at least a subset of the captured images to determine one or more illumination characteristics of the images; and d) based on the determined illumination characteristics, selectively adjusting the drive current amplitude and pulse time of the one or more LEDs.

In some embodiments, the method includes the step of selectively adjusting an image sensor exposure time of the one or more cameras based on the determined illumination characteristics.

In some embodiments, the method includes the step of selectively adjusting an image sensor gain value of the one or more cameras based on the determined illumination characteristics.

Preferably, the LED drive current pulse time is determined based on the image sensor exposure time. More preferably, the drive current amplitude is determined from the LED drive current pulse time based on a predefined relationship between the LED drive current amplitude to the LED drive current pulse time.

In some embodiments, the drive current amplitude and pulse time are selectively adjusted according to a predefined pulse handling curve specified by a manufacturer of the one or more LEDs. Preferably, the pulse handling curve includes a non-linear relationship between the drive current amplitude and pulse time for a given duty cycle.

In some embodiments, the illumination characteristics of a captured image include a brightness measure of the captured image. In one embodiment, the brightness measure includes an average pixel intensity of each pixel in the captured image.

In some embodiments, the method is configured to image one or both eyes of the subject. In these embodiments, the method may include the step of:

c)ii) determining one or more eye tracking parameters of the subject's eye or eyes.

The method may also include the step of:

e) outputting the one or more eye tracking parameters of the subject's eye or eyes.

In some embodiments, the step of processing at least a subset of the captured images includes determining an eye pixel region corresponding to a localized region around the subject's eye. In some embodiments, the illumination characteristics include a brightness measure of the eye pixel region. In one embodiment, the brightness measure includes an average pixel intensity of the pixels within the eye pixel region. In some embodiments, the illumination characteristics include a measure of contrast of pixels within the eye pixel region.

In some embodiments, the step of processing at least a subset of the captured images includes the detection of sunglasses on the subject. In these embodiments, the illumination characteristics include a darkness or reflectivity measure of the sunglasses.

In some embodiments, step d) includes:

i. comparing the brightness measure with a target brightness.

In one embodiment, step d) further includes:

ii. if the brightness measure is less than the target brightness:

selectively increasing an LED drive current pulse time while selectively decreasing an LED drive current amplitude.

In one embodiment, step d) further includes:

iii. if the brightness measure is greater than the target brightness:

selectively decreasing an LED drive current pulse time while selectively increasing an LED drive current amplitude.

In some embodiments, an amount to adjust the drive current amplitude and pulse time of the one or more LEDs is dependent on a difference between the brightness measure with a target brightness. In one embodiment, the amount of adjustment of the drive current amplitude and pulse time is applied incrementally over a plurality of future images.

In some embodiments, the method includes the steps:

generating an integrated image by integrating the pixel values of corresponding pixels within the eye pixel regions of a plurality of previous captured images based on the determined illumination characteristics of a previous captured image or images; and processing the integrated image to determine one or more eye tracking parameters of the subject's eye.

In one embodiment, the number of previous captured images used to generate the integrated image is dependent on the determined illumination characteristics of a previous captured image or images.

In accordance with a third aspect of the present invention there is provided a method of controlling one or more LEDs in an imaging system, the method including:

capturing an image of a subject under illumination by the one or more LEDs;

determining an illumination condition of an image;

comparing the illumination condition to a reference illumination condition; and based on the comparison, selectively adjusting one or both of the drive current amplitude and pulse time of the one or more LEDs according to a predefined pulse handling relationship to either increase the LED output power or LED output energy over the pulse time.

In accordance with a fourth aspect of the present invention there is provided an object tracking method including:

a) controlling a camera to capture images of an object;

b) controlling one or more LEDs to selectively illuminate the object during image capture by the one or more cameras;

c) processing at least a subset of the captured images to determine:

an object pixel region corresponding to a localized region around the object;

one or more eye tracking parameters of the object; and one or more illumination characteristics of the object pixel region;

d) generating a combined image by combining the pixel values of corresponding pixels within the object pixel regions of a plurality of previous captured images based on the determined illumination characteristics of a previous captured image or images; and e) processing the combined image to determine one or more object tracking parameters of the object.

In some embodiments, the combined image is formed by integrating the pixel values of corresponding pixels within the object pixel regions of a plurality of previous captured images based on the determined illumination characteristics of a previous captured image or images.

In some embodiments, the combined image is formed by averaging the pixel values of corresponding pixels within the object pixel regions of a plurality of previous captured images based on the determined illumination characteristics of a previous captured image or images. The illumination characteristics may include a brightness measure of the object pixel region.

In some embodiments, the number of previous captured images used to generate the combined image is determined based on the determined illumination characteristics. In other embodiments, the number of previous captured images used to generate the combined image is determined based on a detected level of motion blur in the images.

Preferably the object is an eye or eyes of a subject and the object pixel region is an eye pixel region.

BRIEF DESCRIPTION OF THE DRAWINGS

Preferred embodiments of the disclosure will now be described, by way of example only, with reference to the accompanying drawings in which.

DETAILED DESCRIPTION

System Overview

The present invention relates to an illumination system and method, preferably for use in a tracking objects. The invention will be described with particular reference to an eye tracking system for use in a vehicle to track the eyes of a vehicle driver. However, it will be appreciated that the invention is applicable to tracking eyes, head movement or other characteristics of a subject in vehicles and other scenarios such as in aircraft, vehicle or aircraft simulators, air traffic control facilities and consumer attention monitoring scenarios.

Figure 1:
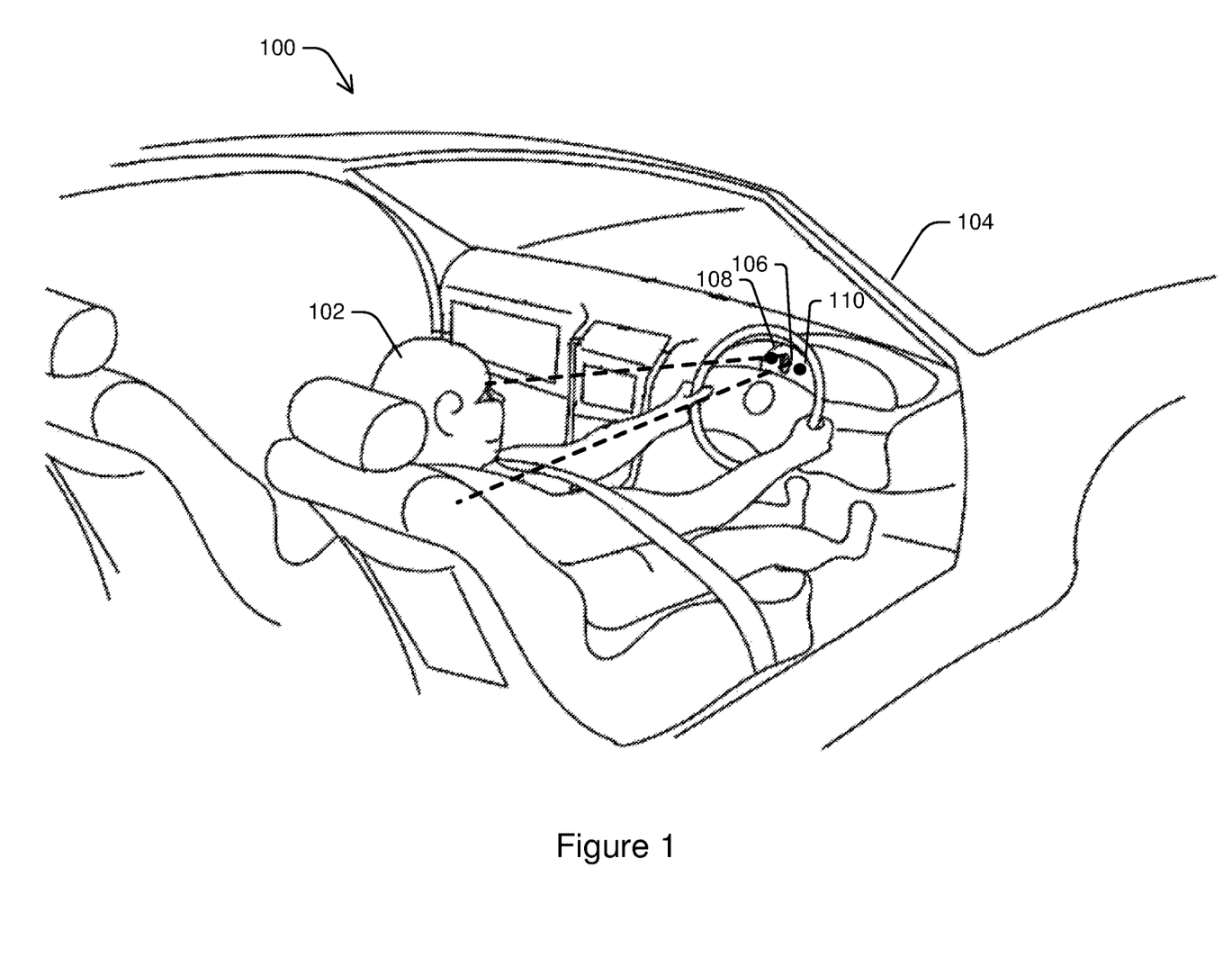
FIG. 1 is a perspective view of an interior of a vehicle illustrating an imaging system according to an embodiment of the invention.
Figure 2:
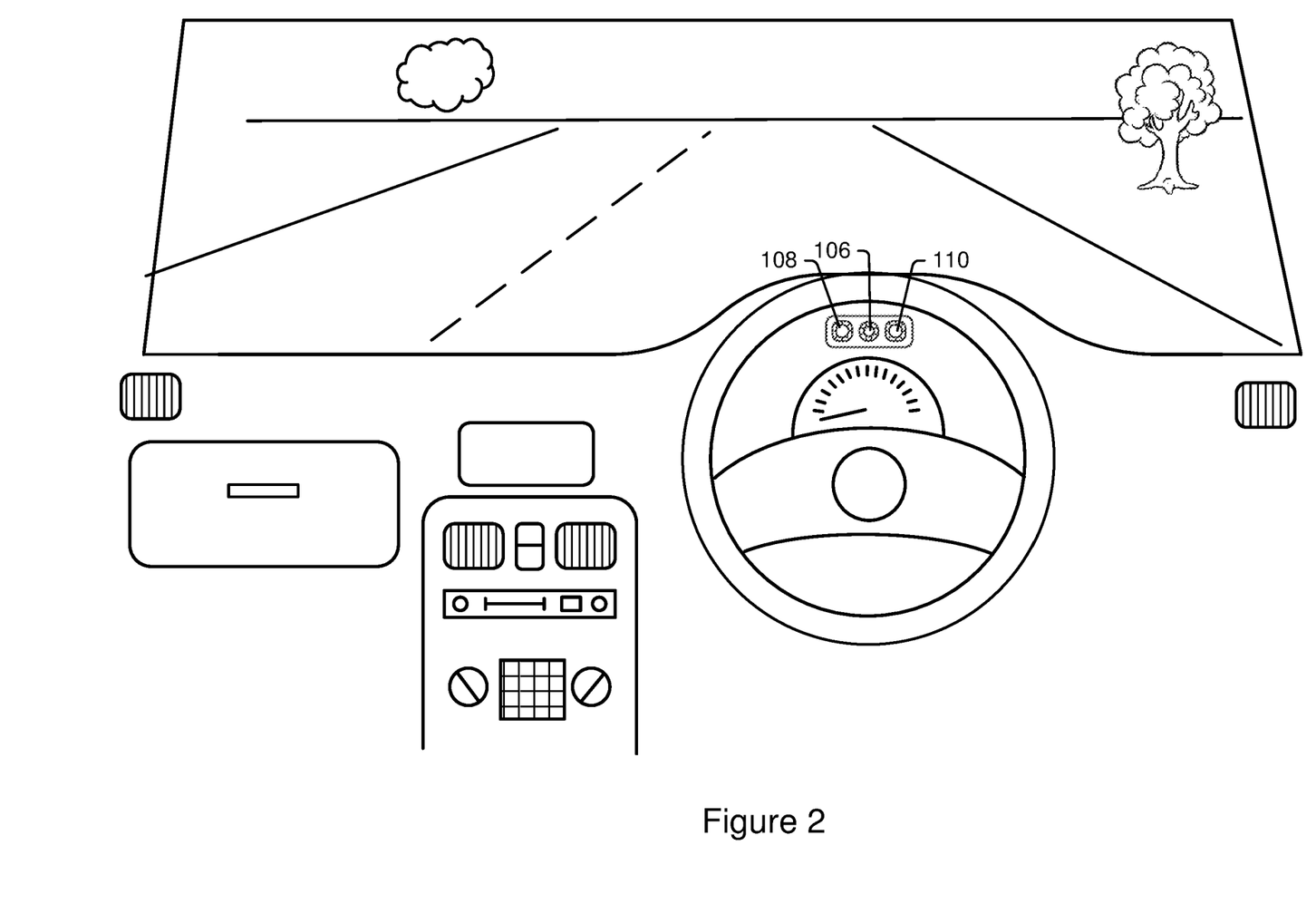
FIG. 2 is a perspective driver's view of the vehicle of FIG. 1 illustrating the eye tracking system of FIG. 1 and forward field of view of the driver.

Referring initially to FIGS. 1 and 2, there is illustrated an eye tracking system 100 for tracking the eyes of a driver 102 of a vehicle 104. System 100 includes an infrared camera 106 that is positioned on or in the vehicle dash instrument display to capture images of the eyes of driver 102 at wavelengths in the infrared range. Two horizontally spaced apart infrared LEDs in the form of light emitting diodes (LEDs) 108 and 110 are disposed symmetrically about camera 106 to selectively illuminate the driver's face with infrared radiation during image capture by camera 106. In some embodiments, LEDs 108 and 110 may be replaced with other types of light sources such as directional filament lights or fluorescent lights. Operation in the infrared range reduces distraction to the driver. Use of two spaced apart LEDs 108 and 110 provide for illumination at different angles which allows for reduction of glare effects as described in PCT Patent Application Publication WO 2016/131075 entitled "Glare Reduction" and assigned to Seeing Machines Limited. It will be appreciated that, in alternative embodiments, system 100 is able to operate using only a single infrared illumination device at the expense of potential performance degradation in the presence of glare, or using more than two LEDs.

Camera 106 is preferably a two dimensional camera having an image sensor that is configured to sense electromagnetic radiation in the infrared range. In other embodiments, camera 106 may be replaced by a single two dimensional camera having depth sensing capability or a pair of like cameras operating in a stereo configuration and calibrated to extract depth. Although camera 106 is preferably configured to image in the infrared wavelength range, it will be appreciated that, in alternative embodiments, camera 106 may image in the visible range. As will be described below, in the present invention, camera 106 includes an image sensor employing a two dimensional array of photosensitive pixels.

Figure 3:
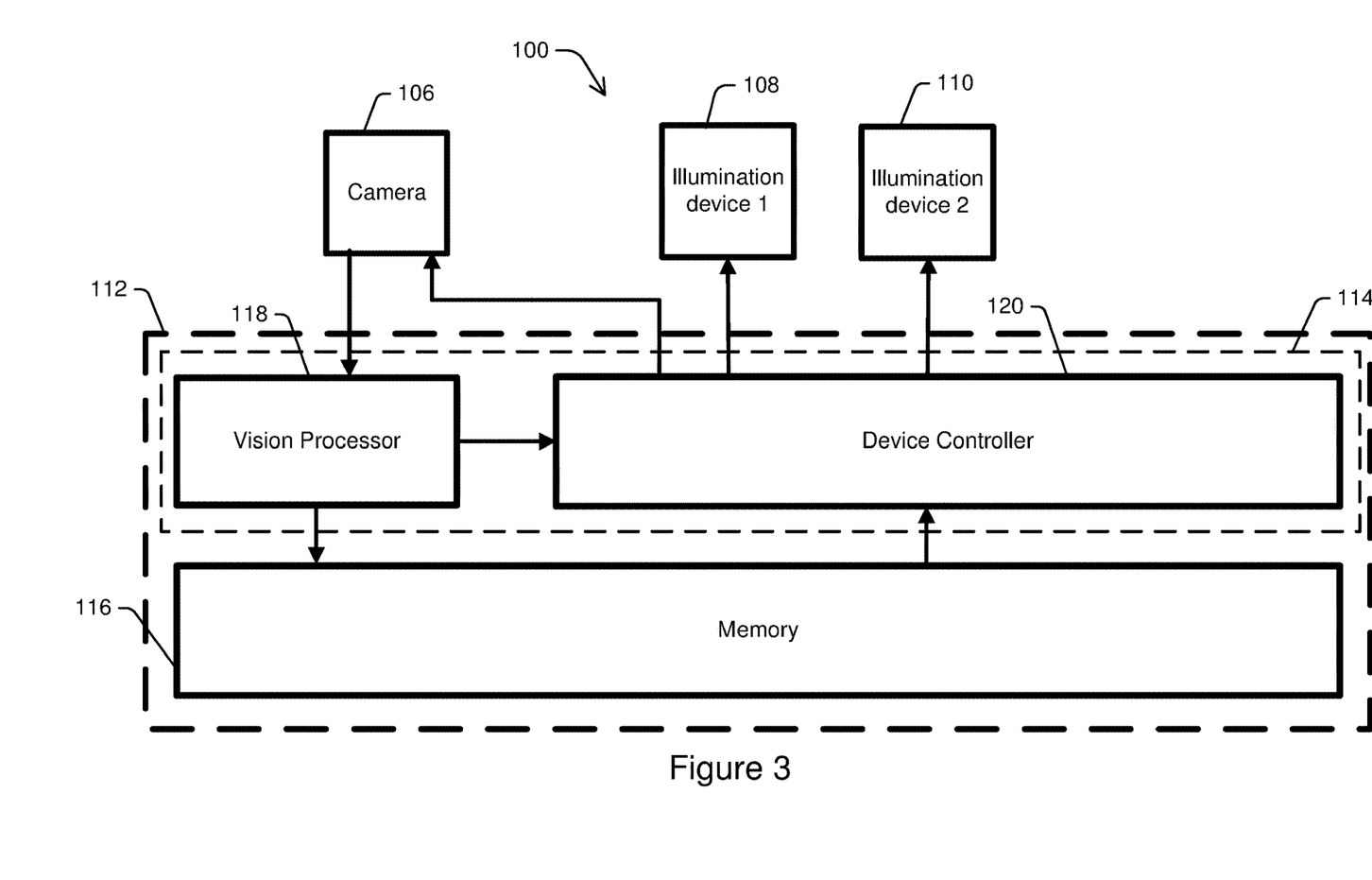
FIG. 3 is schematic functional diagram of the eye tracking system of FIGS. 1 and 2.

As shown in FIG. 3, a system controller 112 acts as the central processor for system 100 and is configured to perform a number of functions as described below. Controller 112 is located within the dash of vehicle 5 and may be connected to or integral with the vehicle on-board computer. In another embodiment, controller 112 may be located within a housing or module together with camera 106 and LEDs 108 and 110. The housing or module is able to be sold as an after-market product, mounted to a vehicle dash and subsequently calibrated for use in that vehicle. In further embodiments, such as flight simulators, controller 112 may be an external computer or unit such as a personal computer.

Controller 112 may be implemented as any form of computer processing device or portion of a device that processes electronic data, e.g., from registers and/or memory to transform that electronic data into other electronic data that, e.g., may be stored in registers and/or memory. As illustrated in FIG. 2, controller 112 includes a microprocessor 114, executing code stored in memory 116, such as random access memory (RAM), read-only memory (ROM), electrically erasable programmable read-only memory (EEPROM), and other equivalent memory or storage systems as should be readily apparent to those skilled in the art.

Microprocessor 114 of controller 112 includes a vision processor 118 and a device controller 120. Vision processor 118 and device controller 120 represent functional elements which are performed by microprocessor 114. However, it will be appreciated that, in alternative embodiments, vision processor 118 and device controller 120 may be realized as separate hardware such as Field Programmable Gate Arrays or microprocessors in conjunction with custom or specialized circuitry.

Vision processor 118 is configured to process the captured images to determine a three dimensional gaze position of the driver 5 within the monitoring environment. To achieve this, vision processor 118 utilizes one or more eye gaze determination algorithms. This may include, by way of example, the methodology described in Edwards et al. Vision processor 118 may also perform various other functions including determining attributes of the driver 5 such as eye closure and tracking the driver's head motion. The raw image data, gaze position data and other data obtained by vision processor 118 is stored in memory 116.

Device controller 120 is configured to control camera 106 and to selectively actuate LEDs 108 and 110 in sync with the exposure time of camera 106. LEDs 108 and 110 are preferably electrically connected to device controller 120 but may also be controlled wirelessly by controller 120 through wireless communication such as Bluetooth™ or WiFi™ communication.

During operation of vehicle 104, device controller 120 activates camera 106 to capture images of the face of driver 102 in a video sequence. LEDs 108 and 110 are alternatively activated and deactivated in synchronization with alternate frames of the images captured by camera 106 to illuminate the driver during image capture. Working in conjunction, device controller 120 and vision processor 118 provide for capturing and processing images of the driver to obtain driver state information such as drowsiness, attention and gaze position during an ordinary operation of vehicle 104.

System 100 operates in varying lighting conditions, including bright and dark conditions, and when the driver is wearing dark or reflective sunglasses. The present invention relates to controlling LEDs 108 and 110 to increase the robustness of system 100 to operate under these varying lighting conditions.

LED Control Process

In the present invention, system 100 is configured to perform active LED control to enhance the signal to noise (SNR) ratio of captured images in terms of object detection and tracking such as head, facial feature and eye tracking. In the context of eye tracking, the relevant signal component of the SNR refers to the strength or visibility of image features of the driver's eye or eyes as these are the features to be identified and tracked by system 100. The noise component of the SNR includes undesired signal components such as ambient brightness from the environment (e.g. sun), reflections from the environment on the eyes or sunglasses worn by the driver and image sensor dark current noise prominent in dark conditions. The inventors have identified that the non-linear operation of illuminating LEDs can be leveraged to increase or maximize the SNR under varying light conditions. For example, in bright sun conditions, where brightness and reflectivity become a dominant noise source, the LEDs can be controlled to maximize the instantaneous output power or irradiance and minimize pulse duration. In dark image conditions, such as when the driver is wearing dark sunglasses, the LEDs can be controlled to maximize energy by increasing the pulse duration within limits of motion blur.

Figure 4:
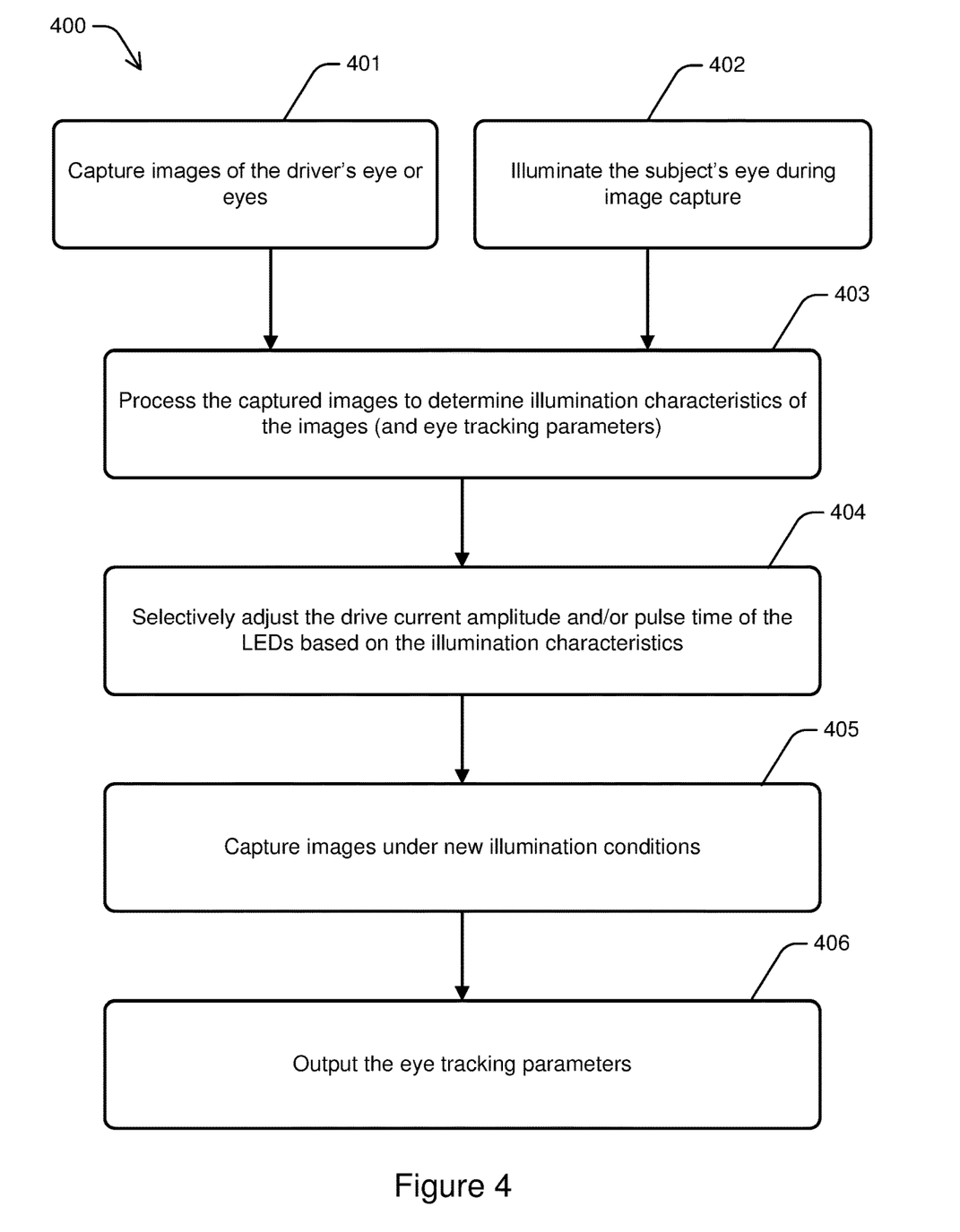
FIG. 4 is a process flow diagram illustrating an imaging method according to an embodiment of the invention.

To achieve this operation, system 100 performs an eye tracking method 400, as illustrated in FIG. 4. At step 401, device controller 120 generates a camera control signal to control camera 106 to capture images of the driver's eye or eyes. The camera control signal includes parameters such as an image sensor exposure time and an image sensor gain value of the camera. In some embodiments, device controller 120 performs an auto-exposure algorithm that determines an appropriate image sensor exposure time based on a detected level of residual or background light. The camera control signal may also include other parameters such as an image resolution and a frame rate.

Figure 5:
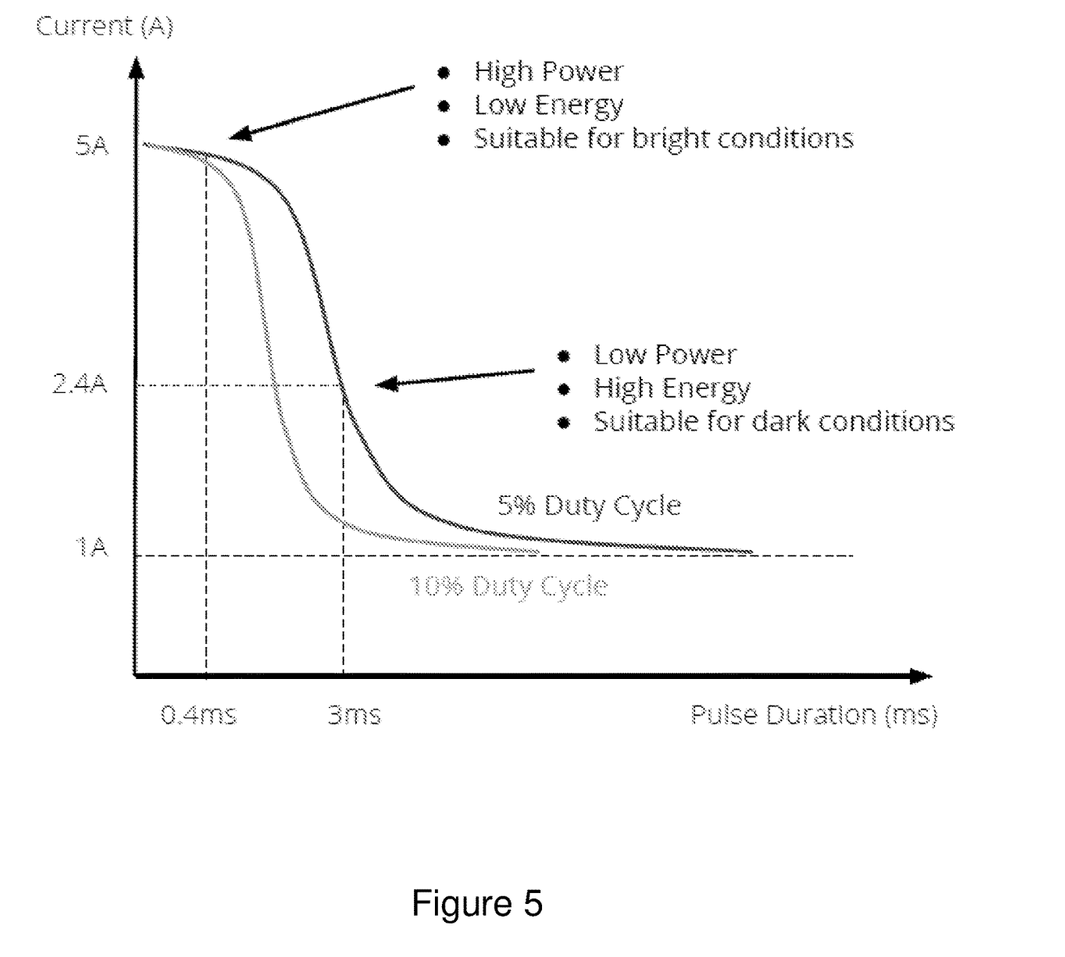
FIG. 5 is a graph illustrating exemplary LED pulse handling curves for 5% and 10% duty cycles.

At step 402, device controller 102 generates a light emitting diode (LED) control signal to control LEDs 108 and 110 to selectively illuminate the subject's eye during image capture by camera 106. The LED control signal controls at least a drive current amplitude and pulse time of the one or more LEDs. LED manufacturers specify control limits on LEDs to avoid damage by excessive heat. These control limits are often specified through a "pulse handling curve" as shown in FIG. 5. The key variables for a design are drive current, pulse duration and duty cycle. The pulse handling curve represents a predefined relationship between these key drive parameters for efficient device operation. The curves for each duty cycle must consider inter alia the LED model, the ambient temperature, and the thermal performance of the design incorporating the LED. If the LED is operated outside the constraints specified by the pulse handling curve, the expected lifetime of the LED is reduced.

In the present invention, the drive current amplitude and pulse time of LEDs 108 and 110 are dynamically controlled to increase the SNR of the imaging system. The manner in which the drive current amplitude and pulse time of the LEDs are controlled is described in detail below.

At step 403, at least a subset of the captured images are processed by vision processor 118 to determine one or more illumination characteristics of the images. This step involves determining an illumination characteristic of the image such as a measure of brightness of the image. By way of example, in one embodiment, an illumination characteristic indicative of brightness includes an average pixel intensity of each pixel in the captured image or an average over a plurality of past images. Another example involves first determining an eye pixel region corresponding to a localized region of pixels around the driver's eye and subsequently obtaining a brightness measure of the eye pixel region. The brightness measure may be an average pixel intensity of the pixels within the eye region or may be an average of the eye region pixels over a plurality of past captured images. This may be performed for one eye or both eyes independently. The illumination characteristics may also include a measure of contrast of pixels within the eye pixel region as a proxy for brightness. In some embodiments, where the driver's eye or eyes can be distinguished, the average pixel intensity of the eye pixel region is used but where the eyes cannot be distinguished, the average pixel intensity of the entire image is used.

Step 403 may also involve determining one or more eye tracking parameters of the subject's eye by running an eye detection and gaze determination algorithm, such as that performed in Edwards et al. These algorithms can be used to determine the eye pixel regions. The eye tracking parameters include two dimensional eye position in the images, eye closure, eye gaze direction and point of regard. The eye tracking parameters may also include head pose measurements such as head position and orientation. If the object being tracked is a subject's head or other facial features, then a detection and tracking routing for those characteristics is performed at step 403.

This processing may be performed on every captured image or a subset such as every two images. In some circumstances the eye or eyes cannot be accurately distinguished and these images may be discarded or stored in conjunction with a flag indicating the eyes could not be identified.

In some embodiments, the processing at step 403 includes the detection of sunglasses on the driver 102. In these embodiments, the illumination characteristics include a darkness or reflectivity measure of the sunglasses.

At step 404, based on the determined illumination characteristics, the drive current amplitude and/or the pulse time of LEDs 108 and 110 is selectively adjusted. These adjusted parameters are applied to the LED control signal, which are applied to the LEDs during subsequent image capture.

Figure 6:
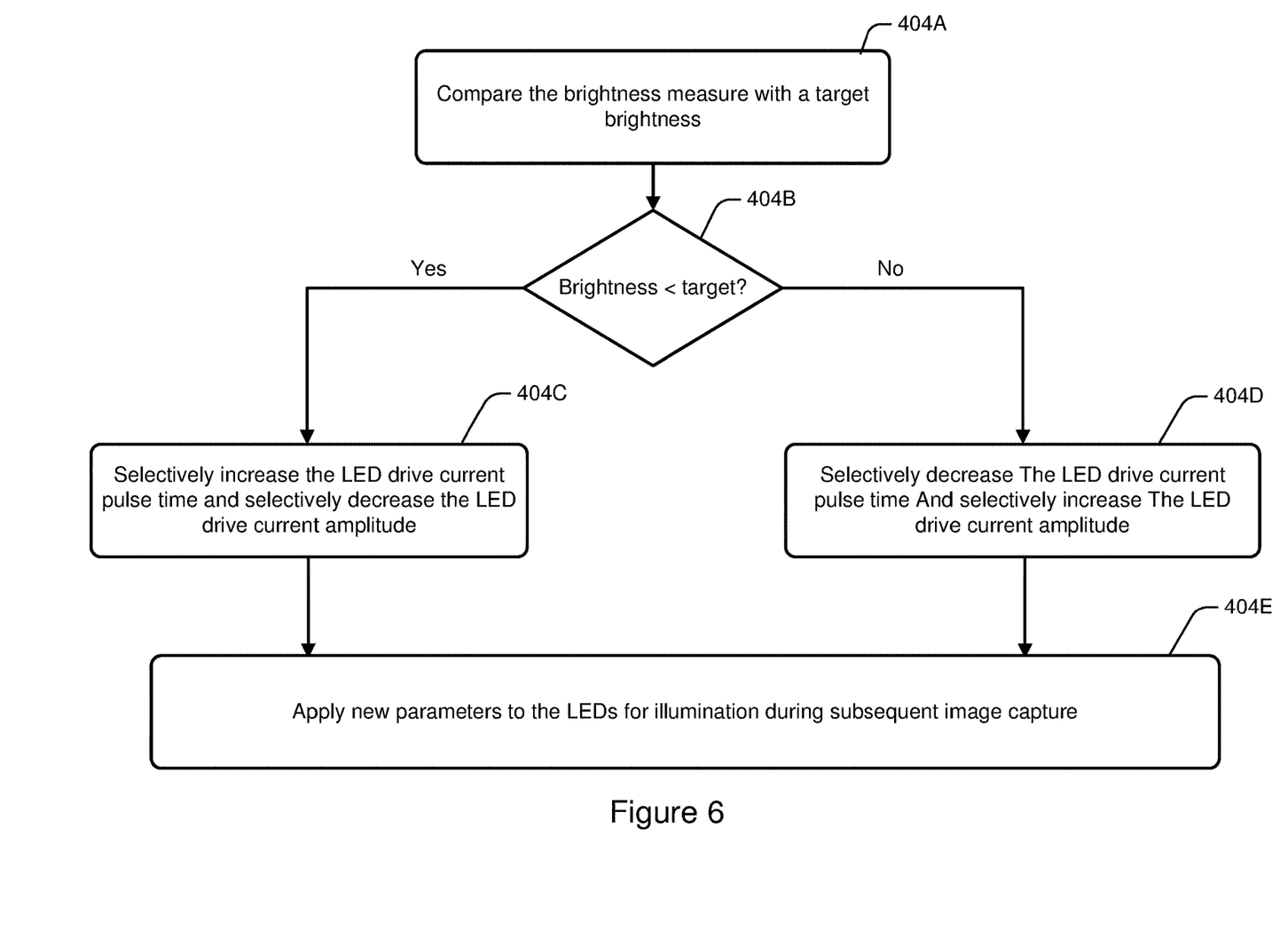
FIG. 6 is a process flow diagram illustrating sub-steps in a process of selectively adjusting the drive current amplitude and/or pulse time of LEDs.

Step 404 includes a number of sub-steps as illustrated in FIG. 6. At sub-step 404A, the measured brightness of the image or eye pixel region determined in step 403 is compared with a target brightness such as an average pixel intensity of the entire image or eye pixel region. The comparison may be measured as an exposure error and specified in terms of exposure stops. An exposure stop is a power of two measure in photography to determine camera shutter and sensor parameters required to double or halve the amount of light received by a sensor. For example, if the current brightness is half the target brightness, then the current brightness should be increased by one exposure stop.

At sub-step 404B, a determination is made as to whether the current brightness measure is less than or greater than the target brightness. If, at sub-step 404B, the brightness measure is less than the target brightness, then, at sub-step 404C, the LED drive current pulse time is selectively increased while the LED drive current amplitude is selectively decreased to provide a longer light pulse with increased overall optical energy. If, at sub-step 404B, the brightness measure is greater than the target brightness, then, at sub-step 404D, the LED drive current pulse time is selectively decreased while the LED drive current amplitude is selectively increased to generate a shorter, more powerful light pulse. Thus, the LEDs 108 and 110 can be driven to increase or maximize power in bright conditions or increase or maximize output energy in dark conditions. Finally, at step 404E, the new parameters are applied to LEDs 108 and 110 in the LED control signals for illumination during subsequent image capture.

The amount by which the LED parameters are adjusted is dependent on a difference between the brightness measure with the target brightness and the practical control limits of the LED determined by the pulse handling curve. Referring again to FIG. 5, if device controller 120 determines that the LED drive current amplitude should be increased to 2.4 A, then, if the LED is driven at a 5% duty cycle, the LED drive current pulse time should be reduced to a maximum of 3 ms to meet the device handling requirements. Thus, the dynamic control of the LED drive current pulse time and drive current amplitude is performed based on the predefined pulse handling curve relationship for the LED.

The amount of adjustment of the drive current amplitude and/or pulse time determined by device controller 120 need not be applied in a single increment. In some embodiments, it is preferable to incrementally apply the determined parameter adjustment over a plurality of future images. The amount to incrementally adjust the parameters may be determined by a damping factor. Such a damping factor may be scaled based on the difference between the brightness measure and the target brightness to allow the system to quickly adapt to large brightness differences. The damping factor may make use of timestamps so the dynamics of the system are invariant to frame-rate.

Figure 7:
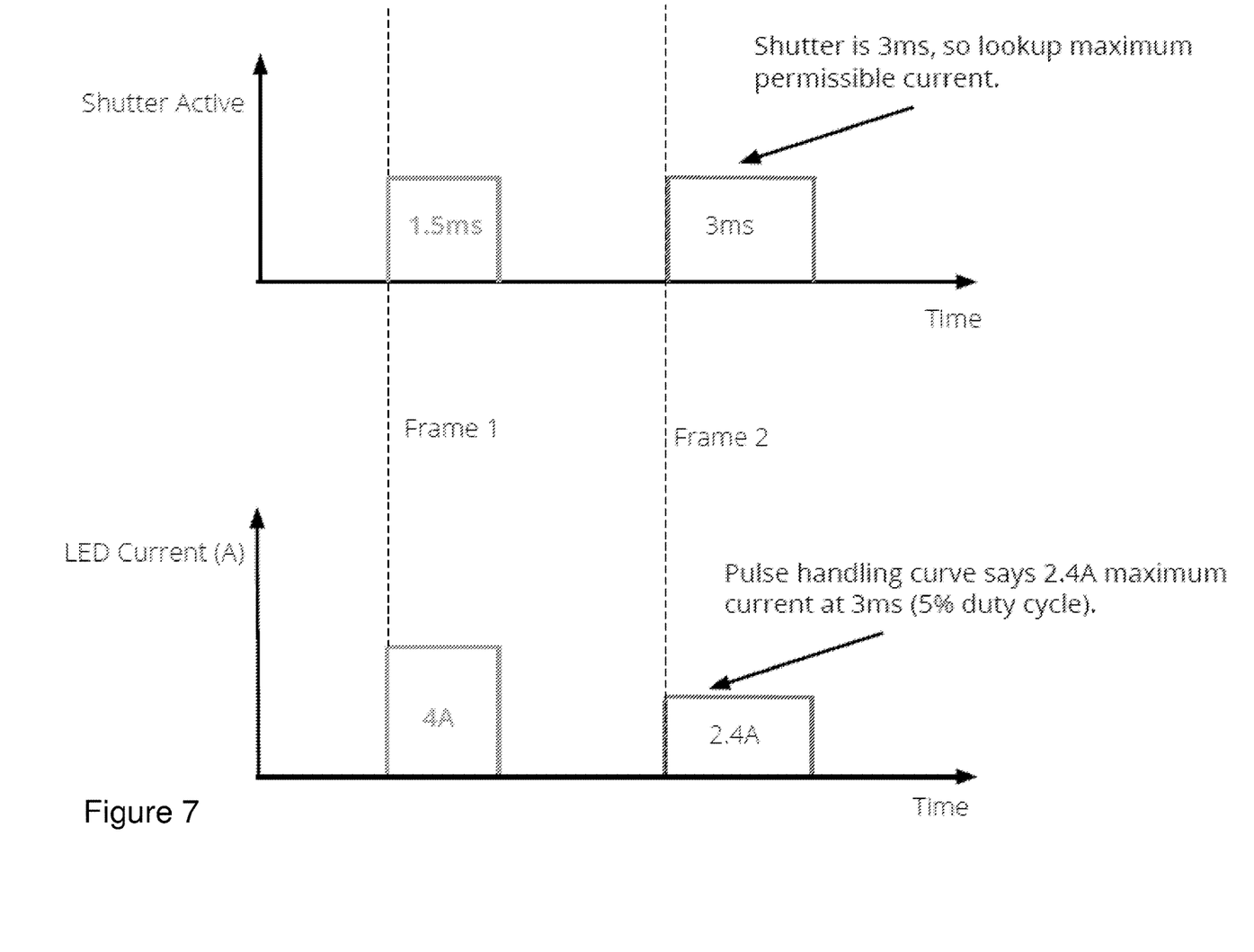
FIG. 7 is a schematic comparison of camera shutter time adjustment with LED drive current adjustment.

As will be described below, the LED control is preferably performed in conjunction with control of camera 106. This includes controlling both an image sensor exposure time (or shutter period) and an image sensor gain value of camera 106. By way of example, if, at step 404B, the image brightness is determined to be below the threshold, the device controller 120 increases the camera shutter period by a predetermined amount. The device controller 120 also adjusts the LED drive current pulse time to match the increased camera shutter period. Based on the pulse handling curve for a given duty cycle (e.g. FIG. 5), the LED drive current is adjusted to the maximum permitted value for that LED drive current pulse time. An example scenario is illustrated in FIG. 7. Here, in Frame 1, the LEDs are driven with a drive current amplitude of 4 A and the shutter period is set at 1.5 ms and the LED drive current pulse time is matched to the shutter period. After determination that the image is too dark, at Frame 2, the shutter period is increased to 3 ms to increase the brightness of subsequent images. The LED drive current pulse time is adjusted to match the new shutter period. To keep within the LED pulse handling curve for a 5% duty cycle, the LED drive current amplitude is reduced to 2.4 A. The gain of the image sensor may be dynamically adjusted in a similar manner based on the brightness comparison performed in step 404. These adjustments to camera parameters are applied through the camera control signal to subsequent images.

Figure 8:
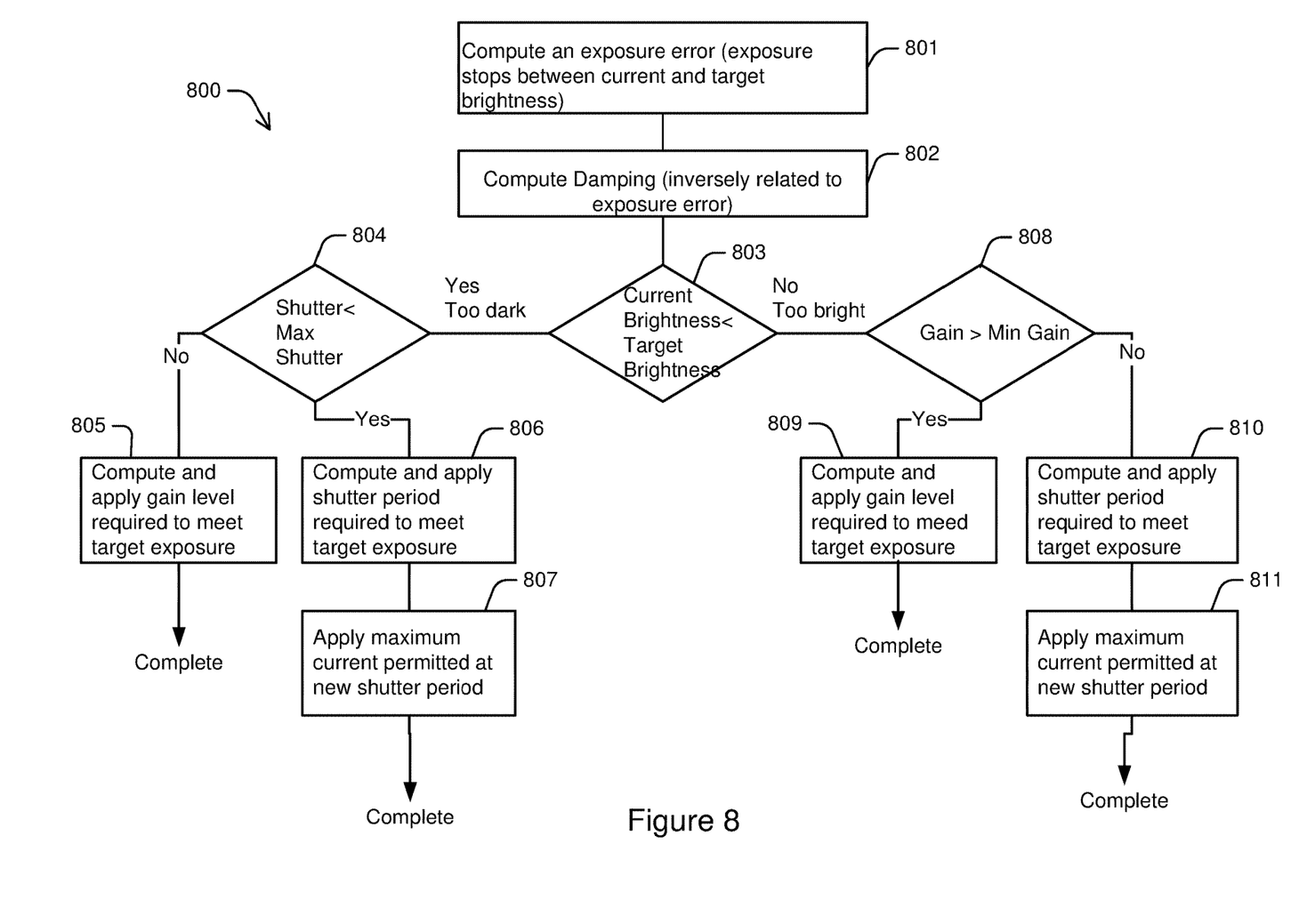
FIG. 8 is a process flow diagram illustrating steps in a process of selectively adjusting the drive current amplitude and/or pulse time of LEDs, as well as sensor gain and sensor exposure time of a camera.

Referring now to FIG. 8, there is illustrated an alternative method 800 of performing step 404 based on initially calculating required camera parameters and then subsequently adjusting the LED parameters based on the constraints of the camera parameters. Method 800 is performed by device controller 120.

At step 801, an exposure error is determined which relates to the number of exposure stops between the brightness measured in step 403 and a target brightness. For example, if the measured brightness is half that of the target brightness, then the exposure error is −1. The exposure error can be calculated from the following equation:

$$\text{exposure error} = \log_2\left(\frac{\text{current pixel intensity}}{\text{target pixel intensity}}\right) \quad \text{(Equation 1)}$$

As mentioned above, the pixel intensity may relate to the average intensity of the pixels of the entire image or the average intensity of the pixels of an eye pixel region within the image.

At step 802, a damping factor is determined. This damping factor determines the number of subsequent image frames over which the adjustment to the camera parameters (sensor exposure time and sensor gain) and LED parameters will be made. The damping factor is used in order to prevent unstable oscillation to exposure control updates. For example, the damping results in the camera sensor exposure time or shutter period being adjusted to be part-way between the current value and the value that would achieve target brightness with the current scene. The damping factor is scaled based on the exposure error, to allow the system to quickly adapt to large exposure errors. The damping factor also uses timestamps so the dynamics of the system are invariant to frame-rate. The damping factor can be calculated from the following equation:

$$\text{damping} = \lim_{n}(\text{stops per second} \times \text{frame period} \times \text{error scaling factor}) \quad \text{(Equation 2)}$$

Where n ranges from 0 to a predefined maximum damping value and the error scaling factor is expressed as:

$$\text{error scaling factor} = \lim_{0\ldots1}(|\text{exposure error}|) \quad \text{(Equation 3)}$$

At step 803, a determination is made as to whether the current image brightness is greater or less than a target brightness. This is determined by the sign of Equation 1 above. A negative exposure error means the current brightness is less than the target brightness while a positive exposure error means the current brightness is greater than the target brightness. The subsequent process flow is divided into two branches depending on whether the current brightness is darker or brighter than the target brightness.

If the current brightness is less than the target brightness (negative exposure error–sensor dark current noise dominates), at step 804, a determination is made as to whether the shutter period (image sensor exposure time) is at its maximum based on limits of motion blur. If the shutter period is determined to be a maximum, no further increase is available and, at step 805, an appropriate image sensor gain level is determined which would increase the current brightness to the target level. If the shutter period is determined to be less than its maximum available value, at step 806, an appropriate longer shutter period is determined which would increase the current image brightness to the target level. Based on this determined shutter period, the corresponding drive current pulse period of LEDs 108 and 110 are adjusted to match the new shutter period. Finally, at step 807, the LED drive current amplitude is reduced to its maximum level according to the LED pulse handling curve as illustrated in FIGS. 5 and 7.

If, at step 803, the current brightness is greater than the target brightness (positive exposure error–brightness/reflection noise dominates), then, at step 808 a determination is made as to whether the image sensor gain is current at its maximum level. If the image sensor gain is less than its maximum, at step 809, an appropriate gain level is determined which would decrease the current brightness to the target level. If the image sensor gain is at its maximum level, at step 810 an appropriate shorter shutter period is determined which would decrease the current image brightness to the target level. The corresponding drive current pulse period of LEDs 108 and 110 are adjusted to match the new shutter period. Finally, at step 811, the LED drive current amplitude is increased to its maximum level according to the LED pulse handling curve as illustrated in FIGS. 5 and 7.

The adjustments to the image sensor gain, image sensor exposure time (shutter period), LED drive current amplitude and LED drive current pulse time at steps 805, 807, 809 and 811 are made incrementally to subsequent images based on the damping factor determined in step 802. Method 800 may be performed on each captured image or on a subset of the captured images. If, during the incremental updating of the parameters the brightness of the scene changes substantially, a new exposure error, damping factor and corresponding parameters may be calculated.

Referring again to FIG. 4, at step 405, subsequent images are captured under the new illumination conditions (LED drive current amplitude and LED drive current pulse time) with corresponding camera parameters. Finally, at step 406 the one or more eye tracking parameters of the driver's eye or eyes are output. The output parameters may be stored in memory 116 or in a separate database for subsequent eye tracking analysis. The parameters may be stored in conjunction with a time stamp and optionally in conjunction with the original or processed images.

Thus, the above described method 400 provides for dynamically controlling LEDs 108 and 110 during eye tracking by assessing current image brightness or illumination conditions and adjusting the LED drive current amplitude and/or drive current pulse time to enhance visibility of the eyes.

Alternate Embodiments

A number of modifications can be made to method 400 and these are described below.

In some circumstances, the illumination conditions are both simultaneously bright (high noise) and the sunglasses lens is extremely dark (small signal), it may not be possible to achieve a sufficient SNR to perform eye tracking simply by controlling the LED and camera parameters as describe above. In these circumstances, vision processor 118 may be controlled to use multiple sequential eye region images as input to the eye-tracking algorithm. In one embodiment, this involves vision processor 118 to generate an integrated image by integrating the pixel values of corresponding pixels within the eye pixel regions of a plurality of previous captured images. If, during the period of integration, the eye or eyes remain relatively stationary within the images, the integration will cause the useful eye signal components to add coherently while the more randomly distributed noise components to add incoherently, thereby improving the SNR. The integrated image can then be processed to determine one or more eye tracking parameters of the subject's eye.

Figure 9:
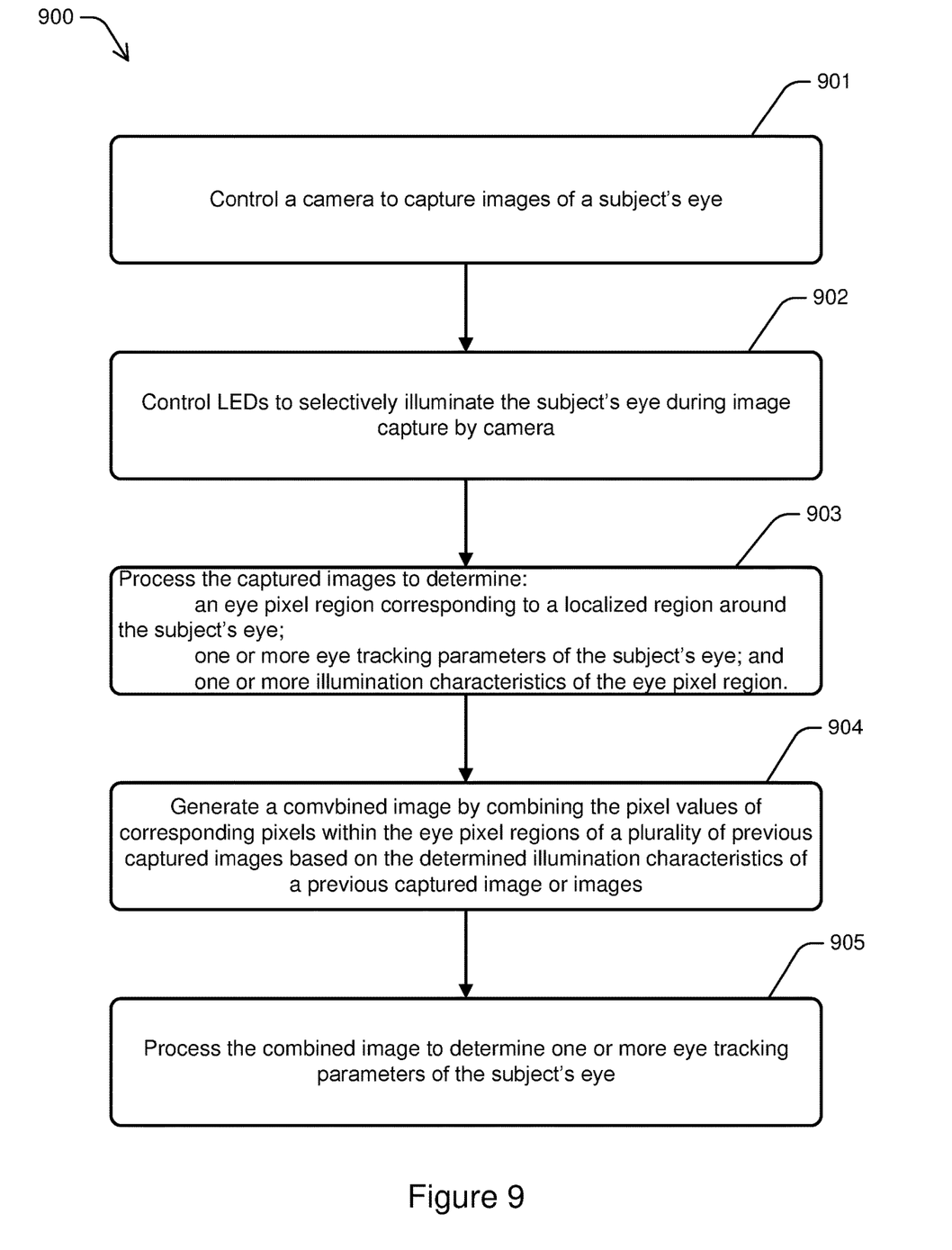
FIG. 9 is a process flow diagram illustrating steps in an imaging method utilizing a multi frame integration or averaging technique for improving tracking robustness.

In one embodiment, this multi frame integration eye tracking technique is performed as method 900 illustrated in FIG. 9. Method 900 includes, at step 901, controlling camera 106 by the device controller 120 to capture images of a subject's eye. At step 902, LEDs 108 and 110 are controlled by the device controller 120 to selectively illuminate the subject's eye during image capture by camera 106. At step 903, the vision processor 118 processes at least a subset of the captured images to determine:

- determining an eye pixel region corresponding to a localized region around the subject's eye;
- eye tracking parameters of the subject's eye; and
- one or more illumination characteristics of the eye pixel region.

Where objects other than eyes are being tracked, the pixel region relates to a localized region around the detected object or objects.

The eye tracking parameters include two dimensional eye position in the images, eye closure, eye gaze direction and point of regard. The illumination characteristics may include brightness in terms of an average pixel intensity of each pixel in the eye pixel region or an average over a plurality of past images.

At step 904, a combined image is generated by combining the pixel values of corresponding pixels within the eye pixel regions of a plurality of previous captured images based on the determined illumination characteristics of a previous captured image or images. Preferably the combined image represents an integrated image which is formed by integrating the pixel values of corresponding pixels within the eye pixel regions of a plurality of previous captured images based on the determined illumination characteristics of a previous captured image or images. However, the combined image may be formed by averaging the pixel values of corresponding pixels within the eye pixel regions of a plurality of previous captured images based on the determined illumination characteristics of a previous captured image or images.

Finally, at step 905, the combined image is processed by vision processor 118 to determine one or more eye tracking parameters of the subject's eye.

The number of images used to generate the integrated image may be determined based on the determined illumination characteristics (e.g. brightness) of the previous captured images and also the motion blur of the imaged scene (e.g. driver head movement). If the eyes are not stationary during the period of integration, the eye-regions may optionally be aligned using feature tracking from the eye or surrounding face or sunglasses/glasses to maximize the alignment of eye features of iris, pupil and eyelids.

The multi-frame integration technique may optionally be implemented as multiple eye-region inputs to a tracking algorithm (e.g. neural network), which combines the information in the eye region input images during the tracking calculation.

Conclusions

The above described system and method provide for more robust eye(or other object) tracking under varying illumination conditions such as conditions of high brightness and reflection and in dark conditions. In particular, the eye tracking can be performed when there is strong contrast on the face, and when the subject is wearing dark or highly reflective glasses. The tight control of the LEDs also results in reducing cost, size and heat dissipation.

The invention leverages the fact that an LED has a nonlinear response and is more efficient at converting electrical energy into light at low drive currents. Using this property, the invention provides two dimensional control in terms of both the drive current amplitude and drive current pulse time to compensate for varying illumination conditions. In dark image conditions, higher output optical energies are achieved at the camera sensor by reducing the LED drive current amplitude and increasing the drive current pulse time over a longer camera exposure time. Conversely, in bright image conditions, higher instantaneous optical power can be achieved by increasing the LED drive current amplitude and reducing the drive current pulse time over a shorter camera exposure time.

The result is that higher image quality performance can be achieved with conventional LED components and thermal limitations over a wider range of lighting conditions.

Interpretation

Throughout this specification, use of the term "element" is intended to mean either a single unitary component or a collection of components that combine to perform a specific function or purpose.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "controller" or "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network.

The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein.

Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Reference throughout this specification to "one embodiment", "some embodiments" or "an embodiment" means that a particular feature, structure or characteristic described in connection with the embodiment is included in at least one embodiment of the present disclosure. Thus, appearances of the phrases "in one embodiment", "in some embodiments" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of exemplary embodiments of the disclosure, various features of the disclosure are sometimes grouped together in a single embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Thus, while there has been described what are believed to be the preferred embodiments of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

I claim:

1. An imaging system including:
   one or more cameras for capturing images of a scene;
   one or more light sources configured to selectively illuminate the scene during image capture by the one or more cameras;
   a processor configured to process at least a subset of the captured images to determine one or more tracking parameters of the scene and to determine one or more illumination characteristics of the images; and
   a controller configured to send a control signal to the one or more light sources to control the drive current amplitude and pulse time of the one or more light sources, wherein the controller selectively adjusts the drive current amplitude and pulse time based on the determined illumination characteristics of a previous captured image or images;
   wherein the controller is configured to control the drive current pulse time of the one or more light sources to match an image sensor exposure time of the one or more cameras; and
   wherein the drive current amplitude is determined from the light source drive current pulse time based on a predefined relationship between the light source drive current amplitude to the light source drive current pulse time.

2. The imaging system according to claim 1 wherein the controller is also configured to control an image sensor gain value of the one or more cameras based on the determined illumination characteristics of a previous captured image or images.

3. The imaging system according to claim 1 wherein the light source drive current pulse time is determined based on the image sensor exposure time.

4. The imaging system according to claim 1 wherein the controller selectively adjusts the drive current amplitude and pulse time according to a predefined pulse handling curve specified by a manufacturer of the one or more light sources.

5. The imaging system according to claim 1 wherein the illumination characteristics of a captured image include a brightness measure of the captured image.

6. The imaging system according to claim 5 wherein the brightness measure includes an average pixel intensity of each pixel in the captured image.

7. An imaging system according to claim 1 configured to image one or both eyes of a subject.

8. The imaging system according to claim 7 wherein the processing of at least a subset of the captured images includes determining an eye pixel region corresponding to a localized region around the subject's eye.

9. The imaging system according to claim 8 wherein the illumination characteristics include a brightness measure of the eye pixel region.

10. The imaging system according to claim 9 wherein the brightness measure includes an average pixel intensity of the pixels within the eye pixel region.

11. The imaging system according to claim 9 wherein the illumination characteristics include a measure of contrast of pixels within the eye pixel region.

12. The imaging system according to claim 1 wherein the scene includes a subject and the processing of at least a subset of the captured images includes the detection of sunglasses on a subject and the illumination characteristics include a darkness or reflectivity measure of the sunglasses.

13. An imaging method including:
   a) generating a camera control signal to control one or more cameras to capture images of a scene;
   b) generating a light source control signal to control one or more light sources to selectively illuminate the scene during image capture by the one or more cameras, the light source control signal controlling at least a drive current amplitude and pulse time of the one or more light sources;
   c) processing at least a subset of the captured images to determine one or more illumination characteristics of the images; and
   d) based on the determined illumination characteristics, selectively adjusting the drive current amplitude and pulse time of the one or more light sources;
   wherein the drive current pulse time of the one or more light sources is controlled to match an image sensor exposure time of the one or more cameras; and
   wherein the drive current amplitude is determined from the light source drive current pulse time based on a predefined relationship between the light source drive current amplitude to the light source drive current pulse time.

14. The method according to claim 13 including the step of selectively adjusting an image sensor gain value of the one or more cameras based on the determined illumination characteristics.

15. The method according to claim 13 wherein the light source drive current pulse time is determined based on the image sensor exposure time.

16. The method according to claim 13 wherein the drive current amplitude and pulse time are selectively adjusted according to a predefined pulse handling curve specified by a manufacturer of the one or more light sources.

* * * * *